United States Patent
Adrian (10) Patent No.: US 9,767,839 B2
(45) Date of Patent: Sep. 19, 2017

(54) INTER-RACK GEAR TRACK SYSTEM

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 93 days.

(21) Appl. No.: 14/968,851

(22) Filed: Dec. 14, 2015

(65) Prior Publication Data

US 2017/0025144 A1    Jan. 26, 2017

Related U.S. Application Data (60) Provisional application No. 62/196,779, filed on Jul. 24, 2015.

(51) Int. Cl.
   *G11B 17/22*   (2006.01)
   *A47F 7/00*    (2006.01)
   *B65G 1/06*    (2006.01)

(52) U.S. Cl.
   CPC .......... *G11B 17/225* (2013.01); *A47F 7/0057* (2013.01); *B65G 1/06* (2013.01)

(58) Field of Classification Search
   CPC ........ G11B 17/225; A47F 7/0057; B65G 1/06
   See application file for complete search history.

(56) References Cited

U.S. PATENT DOCUMENTS

| | | | | |
|---|---|---|---|---|
| 5,341,944 A | * | 8/1994 | Latino | A47B 53/00 211/162 |
| 5,562,202 A | * | 10/1996 | Newcomb | B65G 21/06 198/860.1 |
| 5,567,386 A | * | 10/1996 | Markin | B65G 37/005 198/817 |
| 5,607,275 A | * | 3/1997 | Woodruff | G11B 15/688 360/92.1 |
| 6,222,699 B1 | * | 4/2001 | Luffel | G11B 15/6835 360/92.1 |
| 6,760,644 B2 | * | 7/2004 | Canaday | G11B 17/225 318/567 |
| 6,808,353 B2 | * | 10/2004 | Ostwald | G11B 15/6835 369/30.39 |
| 6,983,469 B2 | * | 1/2006 | Steinhilber | G11B 17/225 369/30.39 |
| 7,028,314 B2 | * | 4/2006 | Coffin | G11B 15/6835 720/606 |
| 7,146,622 B2 | * | 12/2006 | Ostwald | G11B 17/225 720/654 |

(Continued)

*Primary Examiner* — Brian Miller
(74) *Attorney, Agent, or Firm* — Perkins Coie LLP (57) ABSTRACT

A multi-rack assembly with an inter-rack gear track system comprising a first rack, a second rack, and at least one intermediate rack positioned between the first and second racks and releasably interconnectable with each other. A segmented gear track extends from the first rack to the second rack. A compression segment is slidably coupled to the first rack and positioned against a biasing member. A clamping segment is slidably coupled to the second rack, and an intermediate segment is slidably coupled to the intermediate rack. A clamping mechanism moves the clamping segment against the intermediate segment forcing the compression segment against the biasing member and clamping the compression segment, the intermediate segment, and clamping segments together.

20 Claims, 7 Drawing Sheets

(56) References Cited

U.S. PATENT DOCUMENTS

| | | | | |
|---|---|---|---|---|
| 7,451,461 B1* | 11/2008 | Luffel | ................ | G11B 15/6835 |
| | | | | 360/92.1 |
| 7,472,405 B2* | 12/2008 | Pierce | ................ | G11B 15/6835 |
| | | | | 369/30.43 |
| 7,515,378 B1* | 4/2009 | Wilkin | ................ | G11B 33/127 |
| | | | | 360/92.1 |
| 9,101,080 B2* | 8/2015 | Czamara | ............... | H05K 7/1497 |
| 2015/0181750 A1* | 6/2015 | Bailey | ................ | H05K 7/20736 |
| | | | | 361/679.48 |
| 2017/0025144 A1* | 1/2017 | Adrian | ................ | G11B 17/225 |

\* cited by examiner

INTER-RACK GEAR TRACK SYSTEM

CROSS-REFERENCE TO RELATED APPLICATION

This patent application claims the priority to and the benefit of U.S. Provisional Patent Application No. 62/196,779, titled Inter-Rack Gear Track System, filed Jul. 24, 2015, which is incorporated herein in its entirety by reference thereto.

TECHNICAL FIELD

This patent application is directed to data storage server configurations and, more specifically, to a disc transport drive mechanism.

BACKGROUND

In data storage server configurations, it is sometimes desirable to assemble multiple racks together for efficient storage of media, such as optical discs. It is also desirable to load and retrieve storage media from a multi-rack assembly with a single disc transport system or disc transport robot. Typically, a disc transport robot travels along a gear track by engaging the gear track teeth with a pinion gear to drive the disc transport robot back and forth along the gear track. The disc transport system can travel between multiple racks along the gear track. Traditionally, gear tracks are either a single long piece of gear track or multiple segments that are fastened together. These traditional gear track arrangements make transport, assembly, and maintenance of the gear track cumbersome. Accordingly, there is a need for a gear track that is easier to assemble and maintain across multiple racks.

BRIEF DESCRIPTION OF THE DRAWINGS

Embodiments of the inter-rack gear track system introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

An inter-rack gear track system is disclosed for use on a multi-rack assembly, such as an optical disc storage and retrieval system. The inter-rack gear track system includes a first rack, a second rack, and at least one intermediate rack positioned between the first and second racks. A segmented gear track extends from the first rack to the second rack. A compression segment is slidably coupled to a base of the first rack and positioned against a resilient member, such as a compression spring. A clamping segment is slidably coupled to a base of the second rack, and an intermediate segment is slidably coupled to a base of the intermediate rack. A clamping mechanism is mounted to the second rack and is operative to move the clamping segment against the intermediate segment, thereby forcing the compression segment against the resilient member and clamping the compression segment, the intermediate segment, and the clamping segment together. In some embodiments, the clamping mechanism comprises a gear train configured to engage an end portion of the clamping segment.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
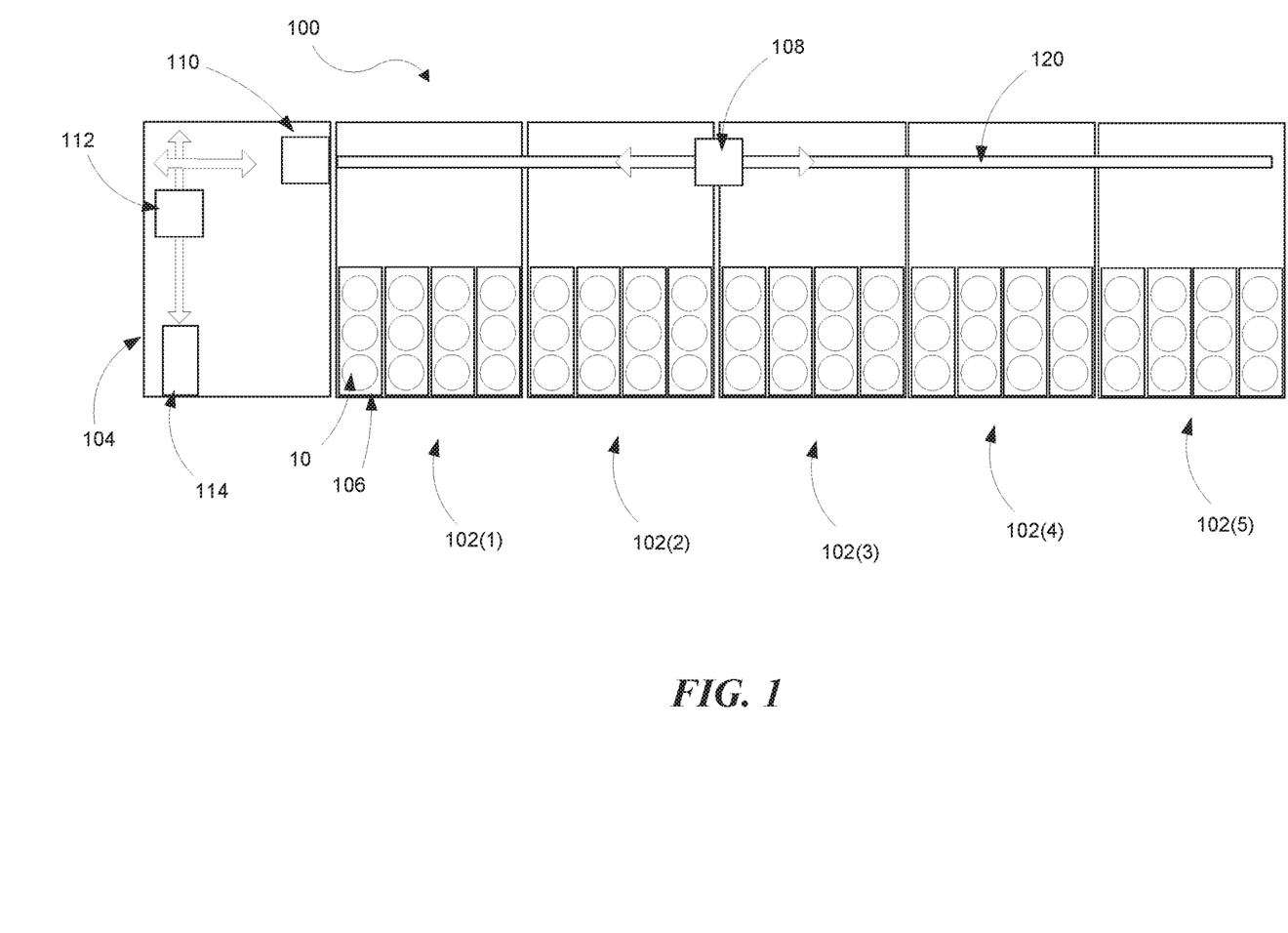
FIG. 1 is a top plan view of an optical disc storage and retrieval system with an inter-rack gear track system in accordance with an embodiment of the present technology.

FIG. 1 illustrates an optical disc storage and retrieval system 100 that includes a plurality of storage units 102(1)-102(5) and a disc drive unit 104. The storage units 102(1)-102(5) each include trays 106 that store discs 10. The disc drive unit 104 includes a disc drive 114 operative to read and write to the discs 10. The storage units 102(1)-102(5) and the disc drive unit 104 are connected together as a multi-rack assembly and are serviced by a disc transport robot 108. The disc transport robot 108 travels along an inter-rack gear track 120 to load and retrieve the discs 10 from the trays 106. A disc loader robot 112 moves the discs 10 from a stage 110 to the disc drive 114.

Figure 2:
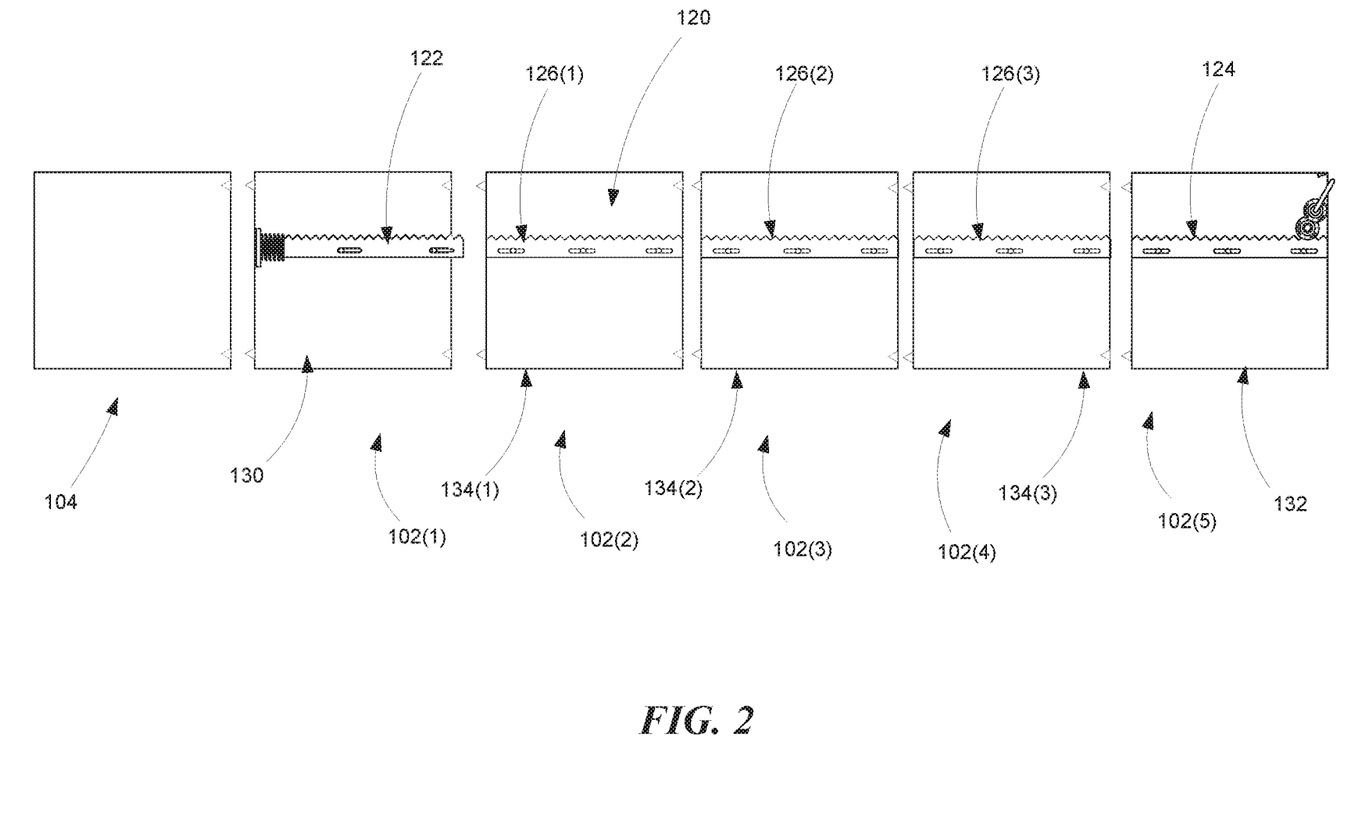
FIG. 2 is an exploded, partial top plan view of a disassembled multi-rack assembly including an inter-rack gear track system according to a representative embodiment.

Each storage unit 102(1)-102(5) includes a rack supporting the trays 106 and the inter-rack gear track 120. With reference to FIG. 2, the storage unit 102(1) includes a first rack 130, and the storage unit 102(5) includes a second rack 132. The storage units 102(2)-102(4) each include an intermediate rack 134(1)-134(3), respectively axially aligned with the first/proximal and second/distal rack assemblies 130 and 132, respectively. It should be appreciated from the figure that the racks are shown in a disengaged state, whereby the individual racks can be easily transported. In order to more clearly illustrate the inter-rack gear track 120, the individual racks 130, 132, and 134(1)-134(3) are schematically represented in the figures to illustrate only the base portion of a component rack. For example, in some embodiments, the racks can be 19-inch EIS compliant racks.

Each rack also includes a gear track segment. For example, the first rack 130 includes a compression segment 122. Intermediate racks 134(1)-134(3) include intermediate segments 126(1)-126(3), respectively, and the second rack 132 includes a clamping segment 124. The structure and function of each gear track segment is described more fully below.

Figure 3A:
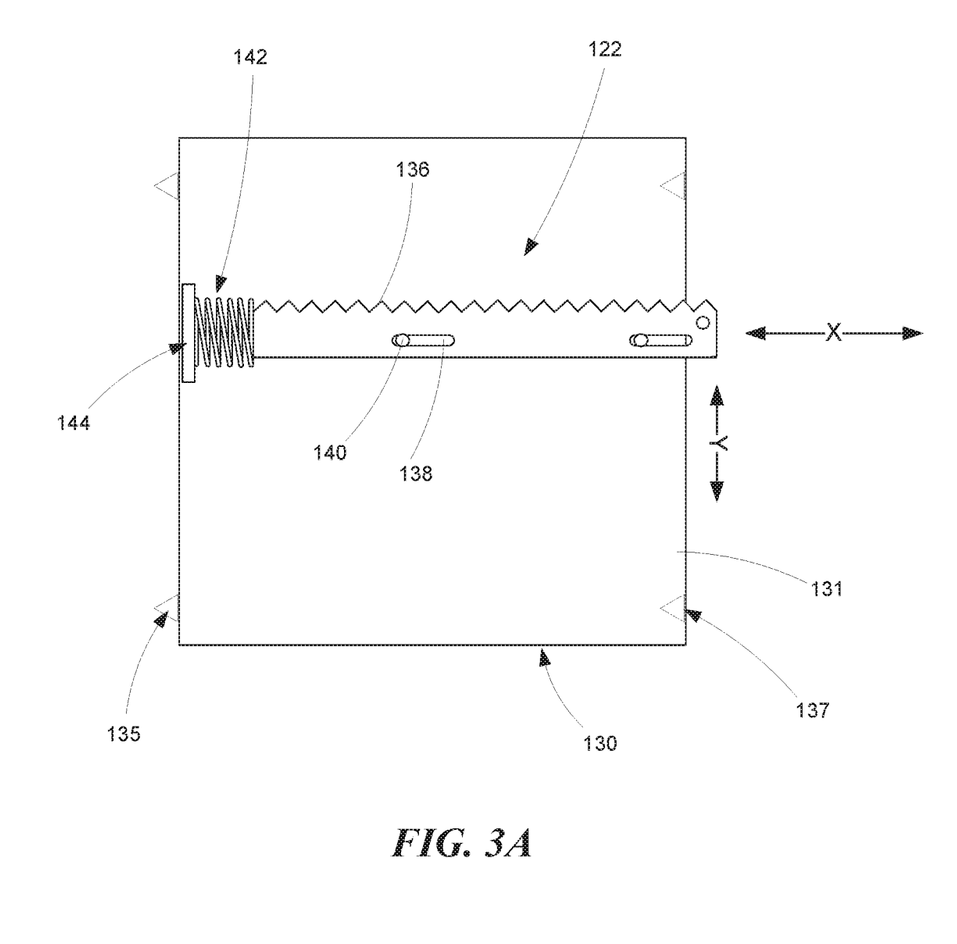
FIG. 3A is a top plan view of the compression segment of the inter-rack gear track system shown in FIG. 2.

As shown in FIG. 3A, the compression segment 122 is slidably coupled to the first rack 130 and positioned against a resilient member, such as a compression spring 142. The compression segment 122 is slidably mounted to the base 131 of the first rack 130 with suitable guide pins and/or fasteners 140 extending through elongate slots 138 in the compression segment 122. Thus, the compression segment 122 is axially movable back and forth relative to the base against the compression spring 142 in the X direction while remaining aligned in the Y direction. Each rack, such as the first rack 130, includes one or more alignment pins 135 on one side of the base and alignment sockets 137 on the opposing side of the base. The alignment pins 135 on one base are sized and positioned to securely fit into the sockets 137 of an adjacent base, so as to securely interconnect the racks and maintain axial alignment of the gear track segments with each other. The base of the first rack 130 includes a spring seat 144 to retain the compression spring 142 in position against the compression segment 122. The compression segment 122 includes a plurality of teeth 136 configured to mate with a pinion gear (not shown) of the disc transport robot 108 (see FIG. 1). As shown in FIG. 3A, the compression segment 122 is in a released state whereby the multi-rack assembly is ready for assembly as described below.

Figure 3B:
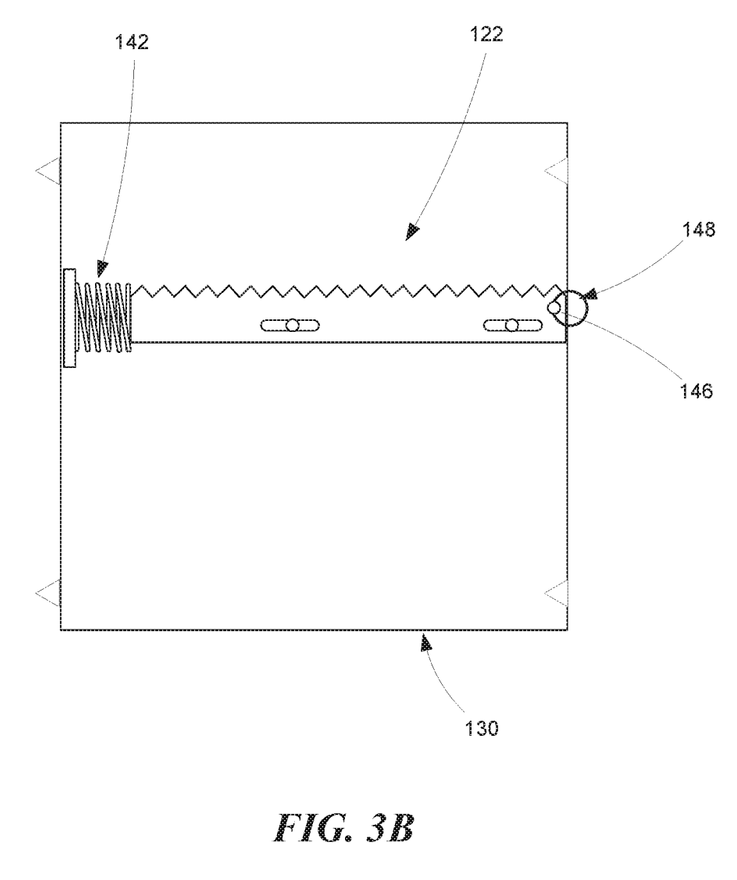
FIG. 3B is a top plan view of the compression segment shown in FIG. 3A configured for transport.

As shown in FIG. 3B, the compression segment 122 is configured so it can be retained in a stowed state by a retainer pin 148. The retainer pin 148 is inserted through a mating retainer aperture 146 in the end of the compression segment 122, which axially aligns with a corresponding aperture (not shown) in the base. Thus, the compression segment 122 is retained out of the way and within the envelope of the first rack 130 during transportation. Prior to assembly of the racks, the retainer pin 148 is removed from the mating retainer aperture 146 to allow the compression segment 122 to extend as shown in FIG. 3A before the first/proximal rack 130 is attached to an adjoining rack, such as an intermediate rack or the second/distal rack 132.

Figure 4:
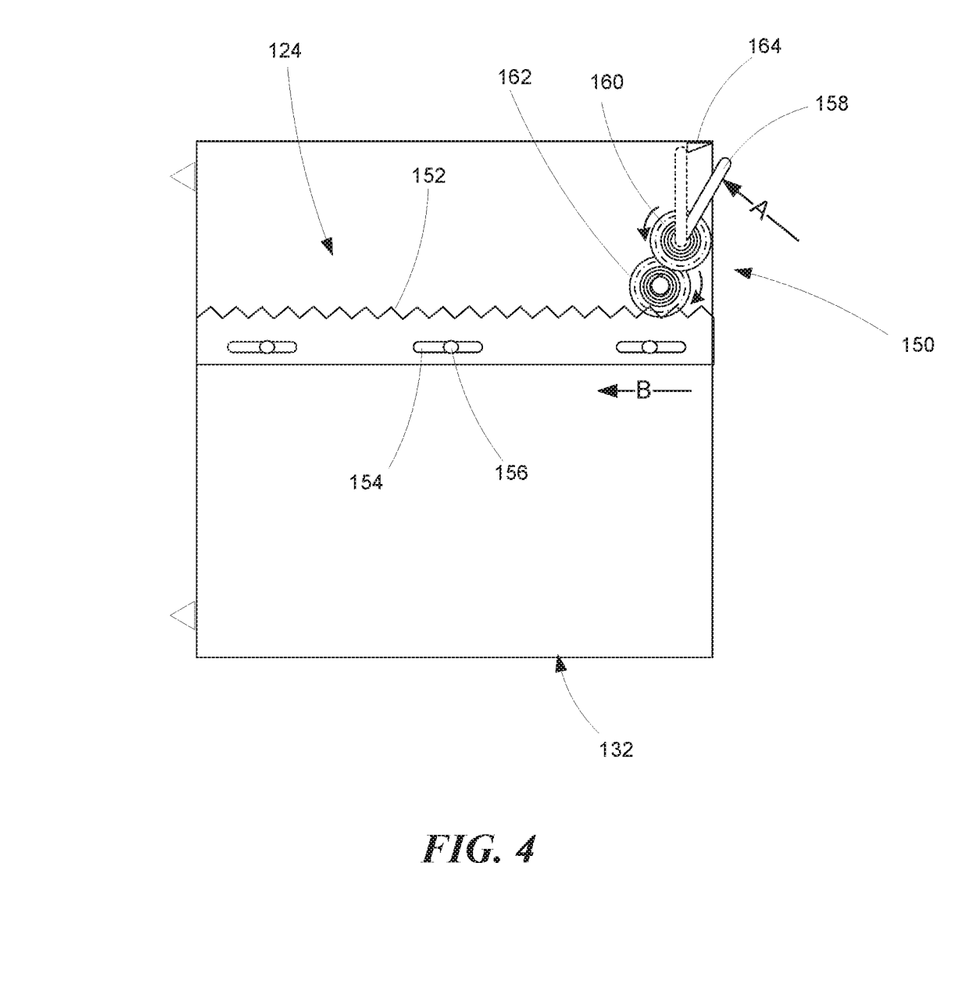
FIG. 4 is a top plan view of the clamping segment of the inter-rack gear track system shown in FIG. 2.

As shown in FIG. 4, the second rack 132 includes a clamping segment 124 slidably coupled to the base of the second rack 132. In this embodiment, the clamping segment 124 is coupled to the base of the second rack 132 with suitable fasteners 156 that extend through slots 154 in the clamping segment, similar to the configuration of the first/proximal rack assembly 130 discussed above. The second rack 132 also includes a clamping mechanism 150 operative to move the clamping segment 124 in direction B. The clamping mechanism 150 includes an arm 158 attached to a gear train (e.g., gears 160 and 162). The arm 158 is movable between a release position and a clamp position. In the release position, the clamping segment can move axially over the fasteners/guide pins for at least a distance corresponding to the length of the slots 127. As arm 158 is moved in direction A toward the clamp position, it rotates gear 160 that rotates gear 162, which is engaged with teeth 152, to drive the clamping segment 124 in direction B as shown. In some embodiments, the clamping mechanism 150 also includes a latch 164 configured to retain the arm 158 in the clamp position.

Figure 5:
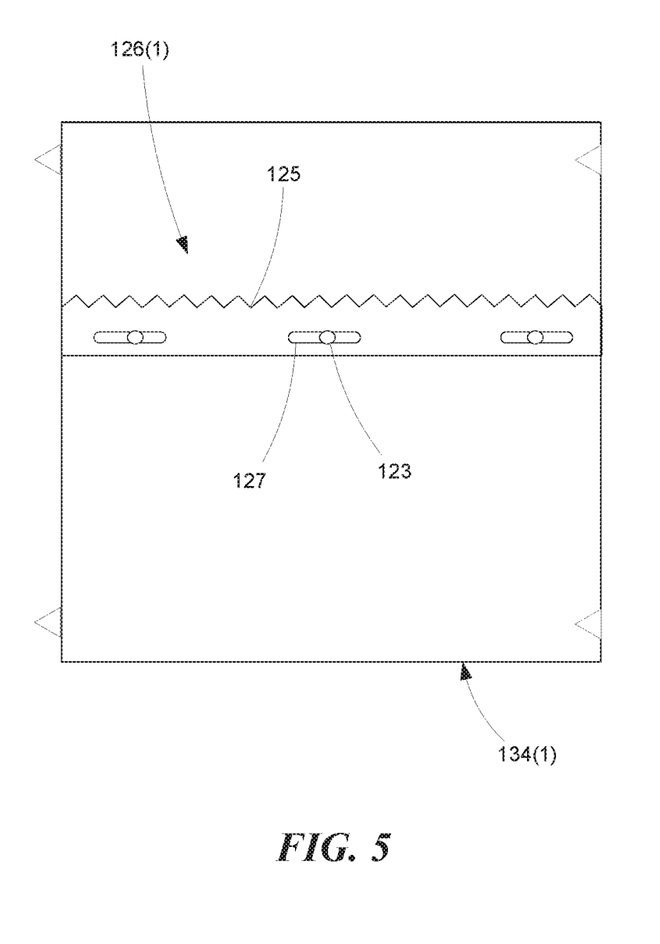
FIG. 5 is a top plan view of an intermediate segment of the inter-rack gear track system shown in FIG. 2.

As shown in FIG. 5, the intermediate rack 134(1) includes an intermediate segment 126(1) attached to the intermediate rack 134(1) with suitable fasteners 123 extending through slots 127 similar to the configurations discussed above. The intermediate segment 126(1) also includes a plurality of teeth 125 configured to mate with the pinion gear (not shown) of the disc transport robot 108 (see FIG. 1). The intermediate racks 134(2) and 134(3) and intermediate segments 126(2) and 126(3) have substantially similar construction as the intermediate rack 134(1) and the intermediate segment 126(1).

Figure 6:
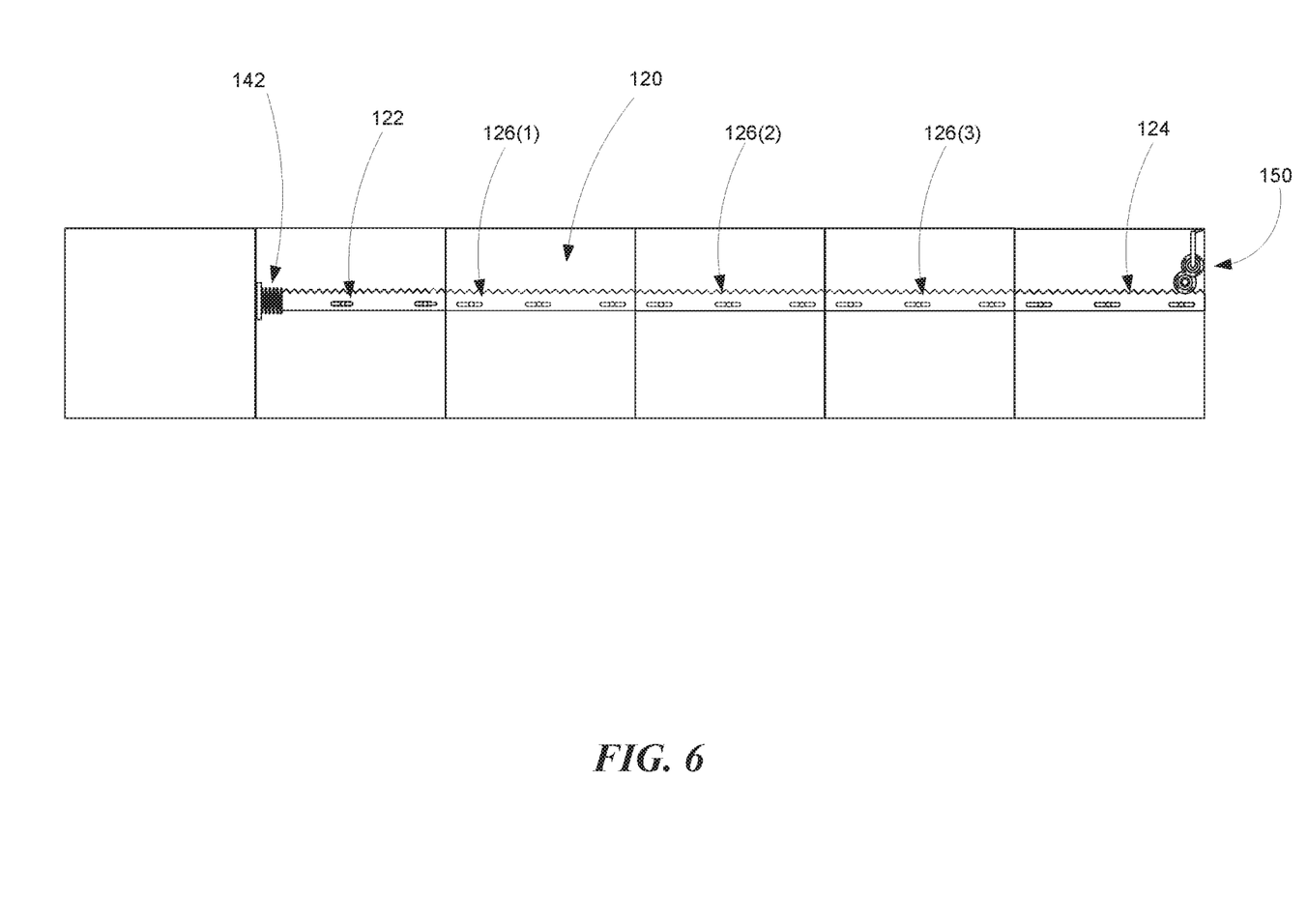
FIG. 6 is a top plan view of an assembled multi-rack assembly including the inter-rack gear track system.

FIG. 6 illustrates an assembled multi-rack assembly with the inter-rack gear track 120 clamped together. Once the compression segment 122 is released from the transport state by pulling retainer pin 148 (see FIG. 3B), the various racks are interconnected with the alignment pins mating with the corresponding alignment sockets of the adjacent rack. The segments extend beyond the edge of the body, overlapping the adjoining edges of the adjacent bodies. The clamping mechanism 150 can be moved to the clamp position, thereby pushing the clamping segment 124 against the intermediate segments 126(1)-126(3) to compress the compression segment 122 against compression spring 142. When the clamping mechanism is moved the segments translate axially along the guide pins so as to push against the compression segment. Accordingly, each gear track segment is resiliently urged against the others imprecise axial alignment and provide a continuous row of gear teeth along which the pinion of the robot can easily and smoothly travel during operation of the optical disc storage and retrieval system 100. Therefore, the inter-rack gear track 120 is easily configured for use without requiring installation and alignment of the individual gear track segments in the field.

Although the embodiments described herein illustrate the teeth of the gear track segments as facing to the side of their respective racks, in other embodiments, the gear track teeth can face upwards from the base of the respective racks.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. An optical disc storage assembly, comprising:

A first storage unit having a first disc storage portion, a first rack supporting the first disc storage portion, and a first gear track segment slidably mounted to the first base portion, the first rack having a first base portion and the first gear track segment being axially movable relative to the first base portion between stowed and released positions, the first storage unit having a biasing member engaging and urging the first gear track segment toward the released position;

A second storage unit releasably coupled to the first storage unit, the second storage unit having a second disc storage portion, a second rack supporting the second disc storage portion, the second storage unit having a second base portion alignable with the first base portion, and having a second gear track segment slidably mounted to the second base portion and in axial alignment with the first gear track segment when the first and second base portions are in alignment, the second gear track segment being axially movable relative to the second base portion between locked and unlocked positions, the second storage unit having a clamping mechanism coupled to the second base portion and engagable with the second gear track segment, the clamping mechanism being moveable between clamped and unclamped positions; and wherein movement of the clamping mechanism toward the clamped position moves the second gear track segment axially toward the first storage unit causing the first gear track segment to move axially toward the engaged position and compress the biasing member, and wherein movement of the clamping mechanism to the unclamped position allows the second gear track segment to move axially away from the first storage unit and allowing the biasing member to move the first gear track segment toward the released position.

2. The optical disc storage assembly of claim 1 wherein each of the first and second gear track segments have a plurality of gear teeth in a substantially coplanar arrangement when the first and second storage units are releasably coupled together with the first and second base portions in alignment.

3. The optical disc storage assembly of claim 1 wherein the first gear track segment has first elongate slots and is slidably attached to the first base portion with first guides positioned within the elongate slots, and the second gear track segment has second elongate slots and is slidably attached to the second base portion with second guides positioned within the second elongate slots.

4. The optical disc storage assembly of claim 1 wherein the first base portion has first alignment members, and the second base portion has second alignment members mateable with the first alignment members to position and maintain alignment of the first and second base portions and the first and second gear track segments.

5. The optical disc storage assembly of claim 1 wherein the first storage unit has a retaining member releasably engagable with the first gear track segment to hold the first gear track segment in the stowed position.

6. The optical disc storage assembly of claim 1, wherein the biasing member is a spring supported by the first base portion.

7. The optical disc storage assembly of claim 6 wherein the first base portion has a spring seat that retains the spring adjacent to the first gear track segment.

8. The optical disc storage assembly of claim 1 wherein the clamping mechanism comprises a gear rotatably engaging the second gear track segment and an arm attached to the gear, wherein the arm is movable to cause rotation of the gear and axial movement of the second gear track segment relative to the second base portion.

9. The optical disc storage assembly of claim 8 wherein the clamping mechanism further comprises a latch engagable with the arm to prevent movement of the arm and rotation of the gear.

10. The optical disc storage assembly of claim 1, further comprising an intermediate storage unit between and in alignment with the first and second storage units, the intermediate storage unit having an intermediate base portion connectable to the first and second base portions, and having an intermediate gear track segment coplanar with and axially aligned with the first and second gear track segments, the intermediate gear track segment being engagable with the first and second gear track segments to form a substantially continuous gear track across the first, intermediate, and second storage units, and wherein the intermediate gear track segment is axially movable with the first and second gear track segments when the clamp mechanism moves between the clamped and unclamped positions.

11. The optical disc storage assembly of claim 10 wherein the first, intermediate, and second gear track segments are coplanar and form a substantially continuous gear path configured for engagement with a disc transport unit to allow the disc transport unit to move across the first, intermediate, or second storage units.

12. The optical disc storage assembly of claim 10 wherein the first base portion has a first alignment guide, the intermediate base portion has a second alignment guide that releasably mates with the first alignment guide to retain the first and intermediate base portion in alignment with the first and intermediate gear track segments in axial aligned abutting engagement.

13. The optical disc storage assembly of claim 10 wherein the intermediate base portion has a third alignment guide that releasably mates with a fourth alignment guide on the second base portion to retain the first and intermediate base portions in alignment with the first and intermediate gear track segments in axially aligned, abutting engagement.

14. The optical disc storage assembly of claim 10 wherein the intermediate storage unit is a first intermediate storage unit, and further comprising a second intermediate storage unit substantially similar to the first intermediate storage unit and positionable in aligned engagement with the first intermediate storage unit and intermediate the first and second storage units.

15. A multi-rack assembly, comprising:
A first rack having a first body portion and a first gear track segment coupled to the first body portion and being axially movable relative to the first body portion between first and second positions, the first rack having a biasing member engaging and urging the first gear track segment toward the second position;
A second rack releasably coupled to the first rack and having a second body portion alignable with the first body portion, and having a second gear track segment movably coupled to the second body portion and in axial alignment with the first gear track segment when the first and second body portions are in axial alignment, the second gear track segment being axially movable relative to the second body portion between third and fourth positions, the second storage rack having a clamping mechanism engagable with the second gear track segment and being moveable between clamped and unclamped positions, wherein movement of the clamping mechanism toward the clamped position moves the second gear track segment axially toward the fourth position causing the first gear track segment to move axially toward the second position and compress the biasing member, and wherein movement of the clamping mechanism to the unclamped position allows the second gear track segment to move axially away from the first rack toward the third position and allowing the first gear track segment to move toward the first position.

16. The multi-rack assembly of claim 15 where the first gear track segment has first elongate slots and is slidably attached to the first body portion with first guides positioned within the elongate slots, and the second gear track segment has second elongate slots and is slidably attached to the second body portion with second guides positioned within the second elongate slots.

17. The multi-rack assembly of claim 15 wherein the first rack has a retaining member releasably engagable with the first gear track segment to hold the first gear track segment in the second position.

18. The multi-rack assembly of claim 15, further comprising an intermediate rack between and in alignment with the first and second racks, the intermediate rack having an intermediate body portion connectable to the first and second body portions, and having an intermediate gear track segment coplanar with and axially aligned with the first and second gear track segments, the intermediate gear track segment being engagable with the first and second gear track segments to form a substantially continuous gear track across the first, intermediate and second racks, and wherein the intermediate gear track segment being axially movable with the first and second gear track segments when the clamp mechanism moves between the clamped and unclamped positions.

19. A multi-rack assembly with an inter-rack gear track system, comprising:
a first rack, a second rack, and at least one intermediate rack positioned between the first and second racks and releasable interconnectable with each other;
a segmented gear track extending from the first rack to the second rack, including: a compression segment slidably coupled to the first rack and positioned against a resilient member;
a clamping segment slidably coupled to the second rack;
an intermediate segment slidably coupled to the at least one intermediate rack; and
a clamping mechanism operative to move the clamping segment against the intermediate segment thereby forcing the compression segment against the resilient member, thereby clamping the compression segment, the intermediate segment, and clamping segments together.

20. The multi-rack assembly of claim 19 wherein the clamping mechanism comprises a gear train configured to engage an end portion of the clamping segment.

* * * * *